(12) United States Patent
Wallner et al.

(10) Patent No.: US 9,772,792 B1
(45) Date of Patent: Sep. 26, 2017

(54) COORDINATED RESOURCE ALLOCATION BETWEEN CONTAINER GROUPS AND STORAGE GROUPS

(71) Applicant: EMC Corporation, Hopkinton, MA (US)

(72) Inventors: Ryan Wallner, South Grafton, MA (US); Shamail Tahir, North Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 238 days.

(21) Appl. No.: 14/752,153

(22) Filed: Jun. 26, 2015

(51) Int. Cl.
G06F 13/12 (2006.01)
G06F 3/06 (2006.01)
G06F 13/42 (2006.01)

(52) U.S. Cl.
CPC ............ G06F 3/0647 (2013.01); G06F 3/061 (2013.01); G06F 3/067 (2013.01); G06F 13/4221 (2013.01)

(58) Field of Classification Search
CPC ........ G06F 3/0647; G06F 3/067; G06F 3/061; G06F 13/4221
See application file for complete search history.

(56) References Cited

U.S. PATENT DOCUMENTS

| 7,925,829 | B1 * | 4/2011 | Michael | ................ | G06F 3/0605 |
| | | | | | 711/114 |
| 8,661,120 | B2 * | 2/2014 | Atchison | ............... | G06F 9/5072 |
| | | | | | 709/217 |
| 8,706,798 | B1 * | 4/2014 | Suchter | ................. | G06F 9/5038 |
| | | | | | 709/202 |
| 8,898,402 | B1 * | 11/2014 | Stronge | ................. | G06F 3/0605 |
| | | | | | 711/100 |
| 9,268,584 | B2 * | 2/2016 | Atchison | | |
| 2008/0162810 | A1 * | 7/2008 | Taguchi | .................. | G06F 3/061 |
| | | | | | 711/114 |
| 2011/0023046 | A1 * | 1/2011 | Gold | ..................... | G06F 9/5083 |
| | | | | | 718/104 |

(Continued)

FOREIGN PATENT DOCUMENTS

| CN | 103810046 A | 5/2014 |
| CN | 103870314 A | 6/2014 |

*Primary Examiner* — Jing-Yih Shyu
(74) *Attorney, Agent, or Firm* — Ryan, Mason & Lewis, LLP

(57) ABSTRACT

An apparatus comprises container host devices each implementing one or more containers, at least one storage platform coupled to the plurality of container host devices and implementing storage resources for utilization by processes running in the containers, and a controller associated with at least a subset of the container host devices and the storage platform. The containers implemented by the container host devices are arranged in container groups and the storage resources implemented by the storage platform are arranged in storage groups. The controller is configured to coordinate establishment of container host resource allocations for one or more of the container groups with establishment of storage resource allocations for one or more of the storage groups. Portions of the container groups may be arranged with corresponding portions of the storage groups into container-storage groups, with the controller generating information indicative of relative levels of resource utilization across the container-storage groups.

20 Claims, 5 Drawing Sheets

(56) References Cited

U.S. PATENT DOCUMENTS

| | | | |
|---|---|---|---|
| 2013/0159637 A1* | 6/2013 | Forgette | G06F 3/0605 |
| | | | 711/154 |
| 2014/0274408 A1 | 9/2014 | Dave | |
| 2014/0317618 A1 | 10/2014 | Behera et al. | |
| 2014/0380307 A1* | 12/2014 | Zhu | G06F 9/45533 |
| | | | 718/1 |
| 2015/0058861 A1* | 2/2015 | Zheng | H04L 47/56 |
| | | | 718/104 |
| 2015/0074058 A1 | 3/2015 | Zhao et al. | |
| 2015/0120928 A1* | 4/2015 | Gummaraju | H04L 67/1008 |
| | | | 709/226 |
| 2016/0055038 A1* | 2/2016 | Ghosh | G06F 9/45558 |
| | | | 718/105 |
| 2016/0062746 A1* | 3/2016 | Chiosi | G06F 8/35 |
| | | | 717/104 |
| 2016/0142338 A1* | 5/2016 | Steinder | H04L 41/0813 |
| | | | 709/226 |
| 2017/0199770 A1* | 7/2017 | Peteva | G06F 9/5088 |

* cited by examiner

COORDINATED RESOURCE ALLOCATION BETWEEN CONTAINER GROUPS AND STORAGE GROUPS

FIELD

The field relates generally to information processing systems, and more particularly to techniques for implementing container environments in information processing systems.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Alternative virtual resources now coming into use in information processing systems include Linux containers. Such containers may be used to provide at least a portion of the virtualization infrastructure of a given information processing system. The resulting system is referred to herein as comprising a container environment.

SUMMARY

We have discovered that conventional information processing systems fail to provide adequate coordination between deployed containers and backend storage resources utilized by those containers.

Illustrative embodiments of the present invention provide coordinated resource allocation between container groups and storage groups in information processing systems. Such an arrangement advantageously avoids undesirable mismatches between container host resource allocations and storage resource allocations.

A given container group in some embodiments is a logical construct that may comprise containers associated with one or more Linux control groups ("cgroups").

In one embodiment, an apparatus comprises a plurality of container host devices each implementing one or more containers, at least one storage platform coupled to the plurality of container host devices and implementing storage resources for utilization by processes running in the containers, and a controller associated with at least a subset of the container host devices and the storage platform. The containers implemented by the container host devices are arranged in a plurality of container groups and the storage resources implemented by the storage platform are arranged in a plurality of storage groups. The controller is configured to coordinate establishment of container host resource allocations for one or more of the container groups with establishment of storage resource allocations for one or more of the storage groups. As noted above, a given container group is illustratively a logical construct distinct from but possibly related to the Linux cgroup feature.

In some embodiments, portions of the container groups may be arranged with corresponding portions of the storage groups into container-storage groups, with the controller generating information indicative of relative levels of utilization of the allocated resources across the container-storage groups.

As noted above, illustrative embodiments described herein provide significant improvements relative to conventional arrangements. For example, in some of these embodiments, overall system resource utilization is significantly improved by eliminating mismatches between container host resource allocations and storage resource allocations.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Container-based portions of such a system are referred to herein as container environments.

Figure 1:
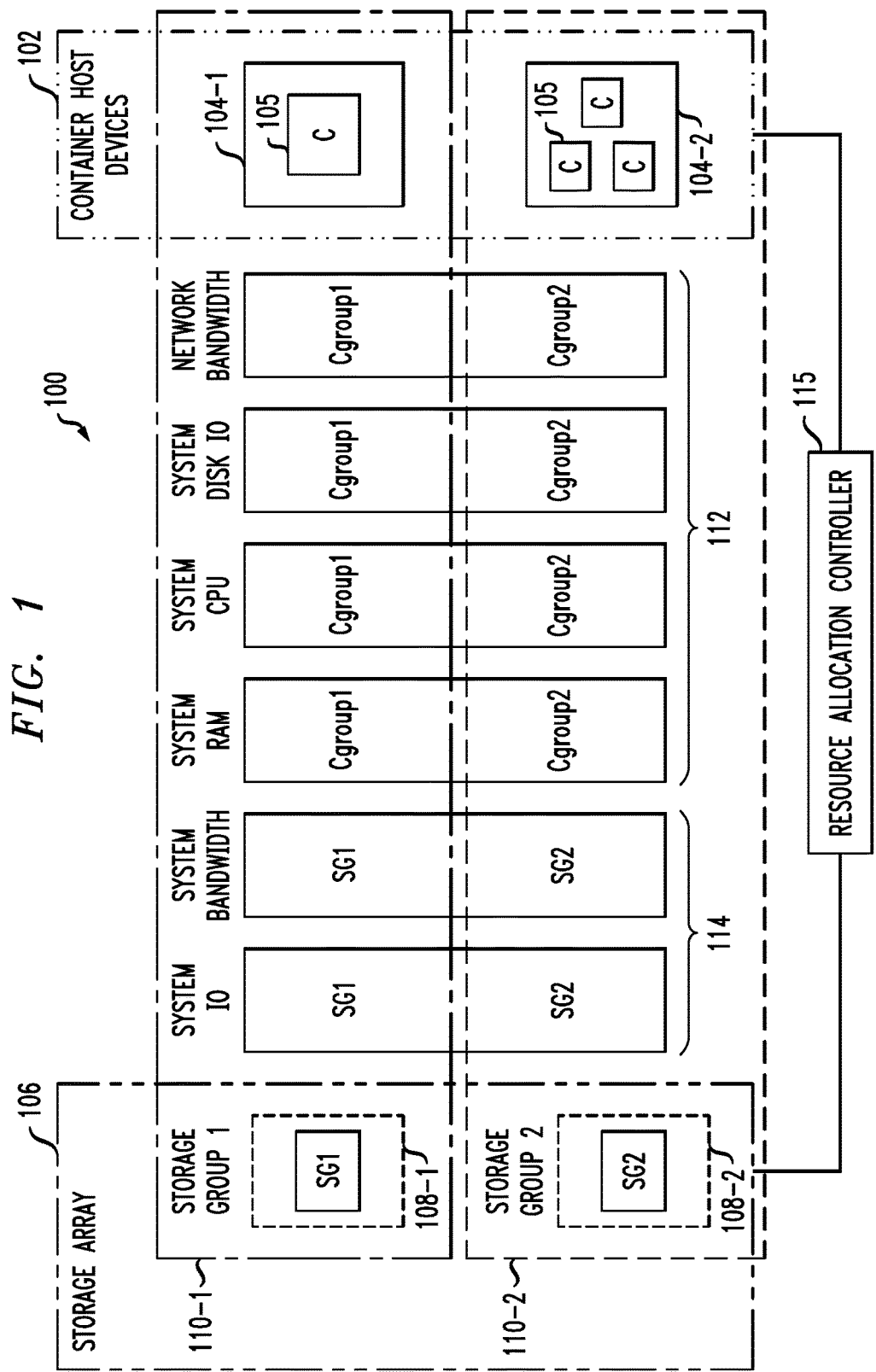
FIG. 1 shows an information processing system configured to provide coordinated resource allocation between container groups and storage groups in an illustrative embodiment.

FIG. 1 shows an information processing system 100 configured in accordance with an illustrative embodiment. The system 100 comprises a plurality of container host devices 102 each implementing one or more containers. The containers implemented by the container host devices are arranged in container groups 104-1 and 104-2. The individual containers ("C") within each of the container groups 104 are denoted by reference numeral 105.

Each of the container host devices 102 illustratively comprises at least one processor coupled to a memory. Such host devices are examples of what are more generally referred to herein as "processing devices."

The containers 105 of the container groups 104 are illustratively implemented as respective Docker containers, but one of more of the containers in other embodiments can comprise other types of containers, including other types of Linux containers (LXCs). It is therefore to be appreciated that embodiments of the present invention are not restricted to use with Docker containers or any other particular type of containers.

The container groups 104 and their corresponding containers 105 are assumed to be implemented on one or more Linux processing devices using Linux kernel control groups ("cgroups"). It is assumed that there is one Linux cgroup associated with each of the container groups 104 in the FIG.

1 embodiment. The container groups 104 are therefore also denoted in FIG. 1 as cgroup1 and cgroup2, respectively.

A given container group in some embodiments is a logical construct that may comprise containers associated with one or more Linux cgroups. For example, in the FIG. 1 embodiment it is assumed that there is a one-to-one correspondence between container groups 104 and respective corresponding Linux cgroups, but in other embodiments it is possible for a given container group to comprise containers implemented using respective ones of a plurality of distinct cgroups. The term "container group" as used herein is therefore intended to be broadly construed, and a given such group should not be viewed as being limited to containers associated with a single Linux cgroup.

Accordingly, numerous other techniques can be used in implementing container groups and corresponding containers in a given embodiment, and such techniques do not necessarily require use of the Linux cgroup feature.

The containers 105 of the container groups 104 may be utilized to implement a variety of different types of functionality within the system 100. For example, such containers can be used to implement platform-as-a-service (PaaS) or infrastructure-as-a-service (IaaS) functionality in system 100, as well as microservices or converged infrastructure within a data center or other cloud computing and storage system.

The system 100 further comprises at least one storage platform illustratively in the form of a storage array 106 coupled to the container host devices 102. Other types of storage platforms can be used in other embodiments. For example, the storage platform in other embodiments can comprise a storage fabric illustratively comprising a plurality of interconnected storage nodes. An example of a storage fabric embodiment will be described below in conjunction with FIG. 5.

The term "storage platform" as used herein is intended to be broadly construed so as to encompass a storage array, a storage fabric or a combination of multiple instances of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage products such as VNX® and Symmetrix VMAX®, both commercially available from EMC Corporation of Hopkinton, Mass. Other types of storage products that can be used in implementing a given storage platform in an embodiment of the present invention include SDS products such as ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation.

Conventional practice generally fails to provide adequate coordination between container host resources allocated to deployed containers and backend storage resources utilized by those containers. As a result, mismatches can arise between container host resource and storage resource allocations, leading to inefficient utilization of resources and corresponding system performance degradations. For example, a discontinuity can result between a storage group IO profile established for a storage group and container host resource allocations for containers that utilize that storage group.

Illustrative embodiments of the present invention provide coordinated resource allocation between container groups and storage groups in information processing systems. Such an arrangement advantageously avoids undesirable mismatches between container host and storage resource allocations, leading to more efficient resource utilization and improved system performance.

The container host devices 102 and storage array 106 are assumed to be communicatively coupled to one another via one or more networks or other interconnections not explicitly shown in the figure.

The storage array 106 implements storage resources for utilization by processes running in the containers 105. At least a subset of the processes running in the containers 105 may comprise respective applications, but other types of processes can be used. By way of example, one or more of the containers 105 can implement respective portions of one or more cloud compute nodes of a cloud computing system. Such compute nodes may each be associated with one or more cloud tenants.

The storage resources implemented by the storage array 106 are arranged in storage groups 108-1 and 108-2, also denoted herein as Storage Group 1 and Storage Group 2, or SG1 and SG2, respectively. The term "storage group" as used herein is intended to be broadly construed so as to encompass various types of logical constructs for grouping of storage resources. For example, a given storage group could comprise a set of storage volumes within a storage array of a storage provider with the set of storage volumes having a corresponding storage IO profile.

In the system 100, portions of the container groups 104 are arranged with corresponding portions of the storage groups 108 into respective ones of a plurality of container-storage groups 110 for purposes of coordinating resource allocations between the container host devices 102 and the storage array 106. More particularly, container group 104-1 is arranged with storage group 108-1 into container-storage group 110-1. Similarly, container group 104-2 is arranged with storage group 108-2 into container-storage group 110-2.

Each of the container-storage groups 110 has associated container host resource allocations 112 and storage resource allocations 114.

The container host resource allocations 112 illustratively comprise system random access memory (RAM), system central processing unit (CPU), system disk input-output (IO) and network bandwidth allocations, each separately allocated for the container groups 104-1 and 104-2 of the respective container-storage groups 110-1 and 110-2. The term "system" in the context of the container host resource allocations 112 refers to system resources of the container host devices 102.

The container host resources in the FIG. 1 embodiment are illustratively controlled at least in part using the above-noted Linux cgroups, which can be configured to limit resource utilization by one or more processes associated with respective containers. For example, pods or other arrangements of multiple containers can be organized as a container group within a single cgroup hierarchy. Each container within the container group in such an arrangement is subject to the resource limits of the cgroup. This means that the corresponding processes will compete for the limited container host resources. If additional granularity in resource allocation control is needed in a given implementation of such an arrangement, the assignment of containers to cgroups can be adjusted accordingly.

All tasks to be performed within a given container are under the parent process identifier (PID) of the container and also inherit the resource limitations of the corresponding container group. Finer-grained limits can be established for particular tasks within the given container. These finer-grained limits can be managed in real-time within system 100 by probing container resource usage and adjusting the finer-grained limits to optimize efficiency or in accordance with established priorities. For example, equal cost fair weighting algorithms could be used within containers in a container group, or a priority can be set to address inefficiencies resulting from burstiness. Any attempt to implement real-time switching between resources utilized by container processes should take into account the possible presence of blocking and locking mechanisms associated with those resources.

The storage resource allocations 114 illustratively comprise system IO and system bandwidth allocations, each separately allocated for the storage groups 108-1 and 108-2 of the respective container-storage groups 110-1 and 110-2. The term "system" in the context of the storage resource allocations refers to system resources of the storage array 106.

By way of example, a ScaleIO™ storage platform allows limits to be placed for designated storage pool volumes on system IO in terms of system IO operations per second (IOPS) and system bandwidth. Similarly, VNX® and Symmetrix VMAX® storage platforms allow specification of storage group IO profiles. Other storage platforms similarly provide functionality for storage group resource allocation.

It is to be appreciated that the particular examples of container host resources and storage resources illustrated in FIG. 1 are for purposes of illustration only, and that other arrangements of additional or alternative container host resources and storage resources can be used in other embodiments.

For example, in addition to or in place of limitations on one or more of the system RAM, system CPU, system disk IO and network bandwidth container host resources mentioned above, a given cgroup implementation of a container group can utilize other resource limitations such as device, block IO, network class and network priority. The device limitation can be used to limit which container host devices are available to a particular cgroup hierarchy. The block IO limitation can be used to limit the total block IO to the container group and can be monitored and adjusted to ensure consistency with a storage group IO profile of the storage array. The network class and network priority limitations can be used to limit traffic by dropping packets on the container host devices, in order to provide consistency with similar resource limitations provided by a storage group IO profile of the storage array.

The system 100 as illustrated in FIG. 1 further comprises a resource allocation controller 115. The controller 115 is configured to coordinate establishment of container host resource allocations for the container groups 104 of container host devices 102 with establishment of storage resource allocations for the storage groups 108 of storage array 106. The term "resource allocation" as used herein is intended to be broadly construed so as to encompass, for example, the various container group and storage group resource limitations mentioned above. The controller 115 illustratively runs on at least one processing device comprising a processor coupled to a memory.

Although shown as a separate external component relative to container host devices 102 and storage array 106 in system 100, the resource allocation controller 115 can be implemented at least in part within one or more of the container host devices 102 or at least in part within the storage array 106. For example, in some implementations of system 100, the controller 115 can be implemented at least in part in the form of at least one software agent running on at least one of the container host devices 102. In an arrangement of this type, the controller 115 may comprise a plurality of software agents each associated with a different one of the container groups 104-1 and 104-2. Such software agents can be configured to communicate with the storage array 106 via at least one application programming interface (API), as will be illustrated in conjunction with the FIG. 5 embodiment.

It is also possible for such a software agent or other instantiation of controller 115 to be implemented on the storage array 106. Moreover, hybrid arrangements are possible, in which different portions of the controller 115 are implemented on the container host devices 102 and the storage array 106.

The controller 115 in the present embodiment is advantageously configured to coordinate establishment of container host resource allocations 112 for the container groups 104 with establishment of storage resource allocations 114 for the storage groups 108 within respective container-storage groups 110. This may involve, for example, controlling the scaling of at least one of the container host resource allocations 112 and the storage resource allocations 114 so as to establish a uniformity between the container host resource and storage resource allocations across the container groups 104 and the storage groups 108 within respective container-storage groups 110.

Additionally or alternatively, the controller 115 can be configured to establish an end-to-end quality of service (QoS) guarantee for one or more of the processes running in containers 105 based at least in part on the coordinated establishment of container host resource allocations 112 for the container groups 104 and storage resource allocations 114 for the storage groups 108 in respective container-storage groups 110.

A wide variety of other types of resource management functionality for container host resources and storage resources can be provided by the controller 115.

The controller 115 is also configured to generate information indicative of relative levels of utilization of at least a subset of the allocated container host and storage resources 112 and 114 across multiple ones of the container-storage groups 110. Such information may be in the form of a heat map comparing resource utilization of different ones of the container-storage groups, or of selected portions of different ones of the container-storage groups. Examples of these and other possible heat map arrangements will be described in more detail below in conjunction with FIGS. 2 and 3.

Figure 2:
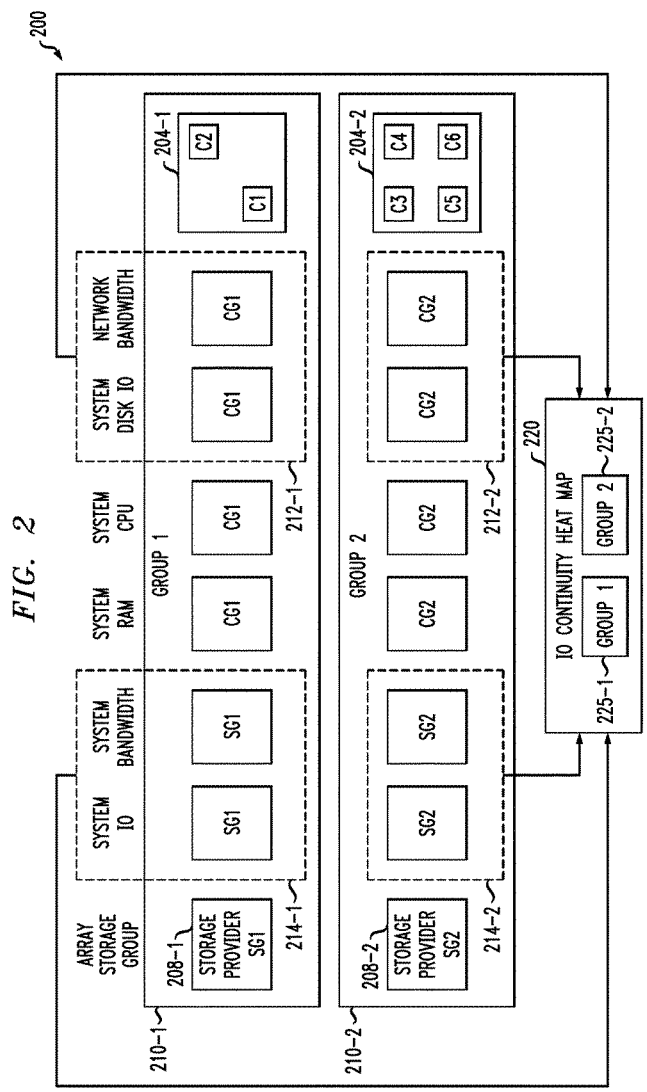
FIGS. 2 and 3 show information processing systems with coordinated resource allocation between container groups and storage groups in other illustrative embodiments.

Referring now to FIG. 2, an information processing system 200 includes container group 204-1 comprising containers C1 and C2, and container group 204-2 comprising containers C3, C4, C5 and C6. The containers C1 through C6 of the container groups 204 are assumed to be running on container host devices that are not explicitly shown in this figure. The container groups 204-1 and 204-2 are also denoted as respective container groups CG1 and CG2. These container groups CG1 and CG2 may be viewed as corresponding to respective Linux cgroups, such as Linux cgroups cgroup1 and cgroup2, but as indicated previously, other types of container groups need not have this correspondence to respective cgroups.

The system 200 further comprises storage groups 208-1 and 208-2 which are also denoted as respective storage provider groups SG1 and SG2. The container group 204-1 and storage group 208-1 are part of a container-storage group 210-1. Similarly, the container group 204-2 and storage group 208-2 are part of a container-storage group 210-2.

It is assumed that the system 200 includes a resource allocation controller such as controller 115, although such a controller is not explicitly shown in the figure. The controller in this embodiment is configured to generate an output display comprising an IO continuity heat map 220. The heat map 220 indicates relative levels of utilization of at least a subset of the allocated container host and storage resources across multiple ones of the container-storage groups. More particularly, in this embodiment, the heat map 220 characterizes IO continuity between allocated container host and storage resources for each of first and second selected groups of allocated resources denoted 225-1 and 225-2, respectively.

The selected resources 225-1 characterized by the heat map 220 include system disk IO and network bandwidth resources 212-1 of container group 204-1 and system IO and system bandwidth resources 214-1 of storage group 208-1, which represent portions of the container-storage group 210-1. Similarly, the selected resources 225-2 characterized by the heat map 220 include system disk IO and network bandwidth resources 212-2 of container group 204-2 and system IO and system bandwidth resources 214-2 of storage group 208-2, which represent portions of the container-storage group 210-2.

The output display comprising heat map 220 advantageously allows quick identification of container-storage groups having container groups or storage groups that are close to saturation in terms of their allocated resources. The associated controller in some embodiments illustratively incorporates a command-line interface (CLI) based filtering feature in order to ensure display of only those groups having resource utilization levels above a specified threshold or otherwise satisfying alternative status conditions.

The FIG. 2 embodiment is an example of one type of arrangement in which a controller is utilized to generate a heat map that characterizes IO continuity between allocated container host and storage resources for each of multiple selected container-storage groups. Other types of information indicative of continuity between allocated container host and storage resources 212 and 214 for one or more selected container-storage groups can be generated and processed in the system 200.

Figure 3:
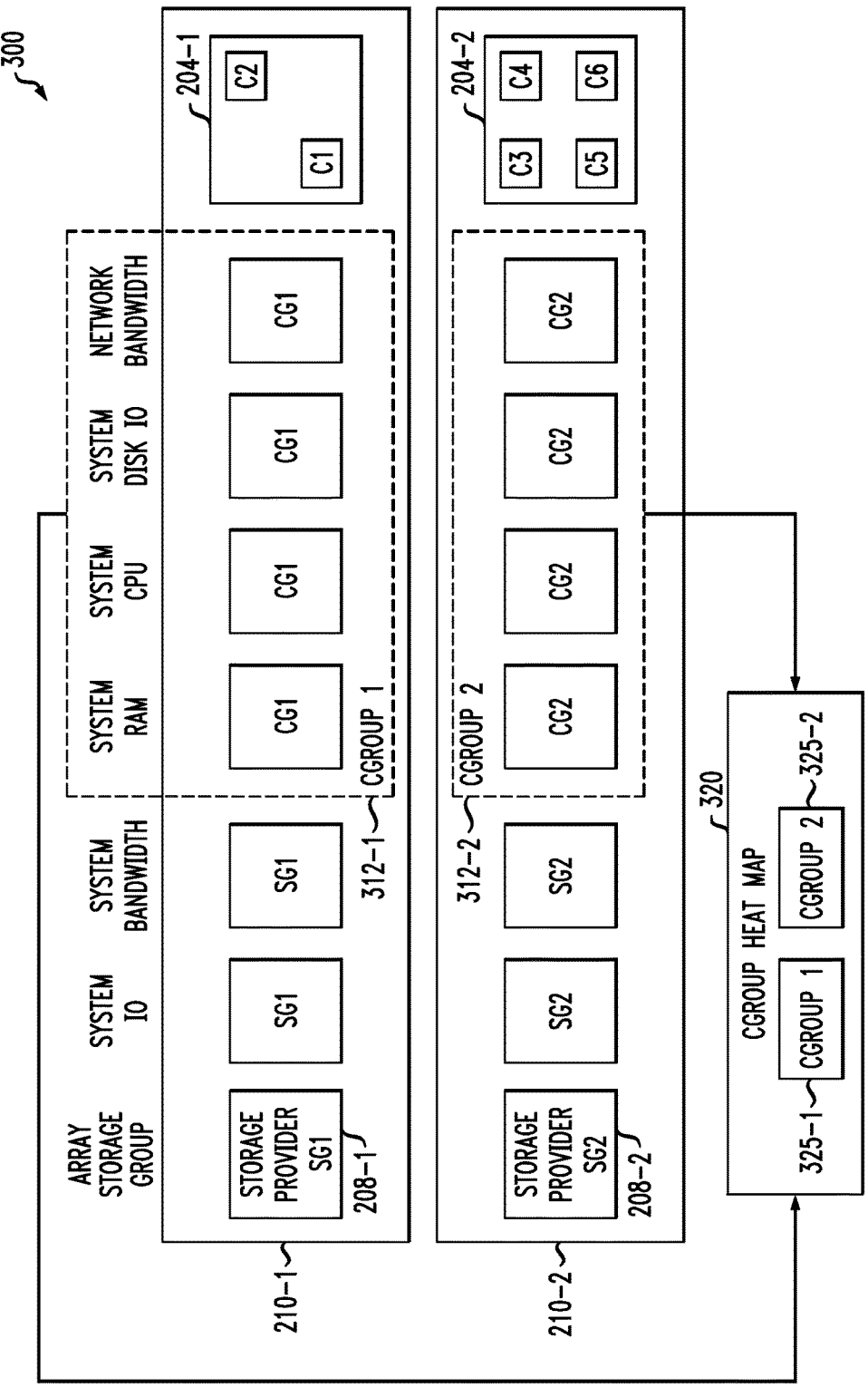

FIG. 3 shows another information processing system 300 that includes the same container groups 204, storage groups 208, container-storage groups 210, container host resource allocations 212 and storage resource allocations 214 as the system 200 of the FIG. 2 embodiment. The system 300 is also assumed to include a resource allocation controller such as controller 115 of FIG. 1, but the controller is not explicitly shown.

In this embodiment, the controller is configured to generate an output display comprising a cgroup heat map 320. The heat map 320 compares resource utilization of at least a first cgroup, denoted cgroup1, with resource utilization for at least a second cgroup, denoted cgroup2. More particularly, in this embodiment, the heat map 320 compares utilization of allocated container host resources 312-1 of a cgroup of the container-storage group 210-1 with utilization of allocated container host resources 312-2 of a cgroup of container-storage group 210-2. These two selected cgroups of container resources are also denoted by reference numerals 325-1 and 325-2, respectively, within the heat map 320.

The output display comprising heat map 320 advantageously allows quick identification of container groups that are close to saturation in terms of their allocated resources. The heat map 320 can be viewed as a secondary level of detail that is provided only for particular selected container groups indicated as problematic in the heat map 220. This additional level of detail in the present embodiment incorporates additional container host resources such as system RAM and system CPU which were not considered in the heat map 220. As in the FIG. 2 embodiment, the associated controller can incorporate a CLI-based filtering feature in order to ensure display of only those groups having resource utilization levels above a specified threshold or otherwise satisfying alternative status conditions.

The FIG. 3 embodiment is an example of one type of arrangement in which a controller is utilized to generate a heat map comparing resource utilization between different container groups. Other types of information indicative of relative levels of utilization of at least a subset of the allocated container host and storage resources 212 and 214 can be generated and processed in the system 300.

The particular arrangements of components shown in the embodiments of FIGS. 1-3 are presented by way of example only. Numerous alternative system configurations can be used to implement coordinated resource allocation between container groups and storage groups as disclosed herein. Also, different heat map utilities or other types of analytics and associated visualizations can be provided.

The operation of another illustrative embodiment of an information processing system will now be described in further detail with reference to the flow diagram of FIG. 4. The process as shown includes steps 400 through 404.

In step 400, containers are arranged in a plurality of container groups. The containers are implemented by a plurality of container host devices, such as the container host devices 102 in the FIG. 1 embodiment. As mentioned previously, the container groups may correspond to respective Linux cgroups, but other arrangements are possible.

In step 402, storage resources are arranged in a plurality of storage groups. The storage resources are implemented by at least one storage platform for utilization by processes running in the containers. For example, the storage resources can be implemented on at least one storage array as in the FIG. 1 embodiment.

In step 404, establishment of container host resource allocations for the container groups is coordinated with establishment of storage resource allocations for the storage groups. Such coordination is illustratively implemented by a resource allocation controller such as controller 115 in the FIG. 1 embodiment. Such an arrangement can be used to provide continuity and uniformity across container host and storage resource allocations for associated container and storage groups, thereby ensuring efficient utilization of container host and storage resources within the system.

As indicated previously, coordinating establishment of container host resource allocations for the container groups with establishment of storage resource allocations for the storage groups may comprise controlling the scaling of at least one of the container host resource allocations and the storage resource allocations so as to establish a uniformity between the container host resource and storage resource allocations across the container groups and the storage groups.

Additionally or alternatively, it is possible to establish an end-to-end QoS guarantee for one or more of the processes running in the containers based at least in part on the coordinated establishment of container host resource allocations for the container groups and storage resource allocations for the storage groups. Such an end-to-end QoS guarantee advantageously encompasses both the container host resources and the storage resources that are allocated to a given group of containers.

Figure 4:
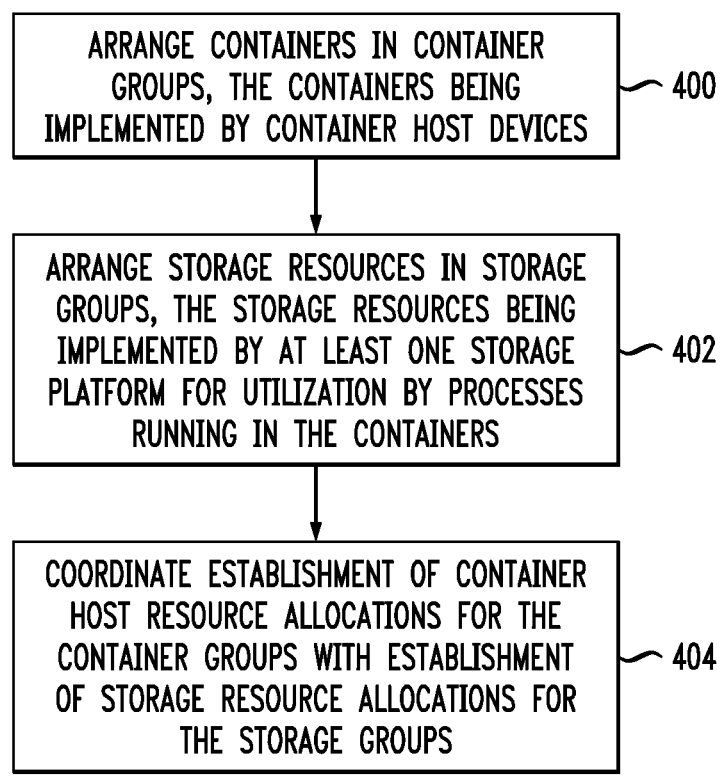
FIG. 4 is a flow diagram of a process for coordinated resource allocation between container groups and storage groups in an illustrative embodiment.

The particular processing operations and other system functionality described in conjunction with the flow diagram of FIG. 4 are presented by way of illustrative example only, and should not be construed as limiting the scope of the invention in any way. Alternative embodiments can use other types of processing operations involving container groups and storage groups in an information processing system and associated coordinated establishment of resource allocations for the container and storage groups. For example, the ordering of the process steps may be varied in other embodiments, or certain steps may be performed concurrently with one another rather than serially. Also, one or more of the process steps may be repeated periodically for different processing scenarios, or performed in parallel with one another. For example, parallel instantiations of one or more of the process steps can be implemented for different container-storage groups within the system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 5:
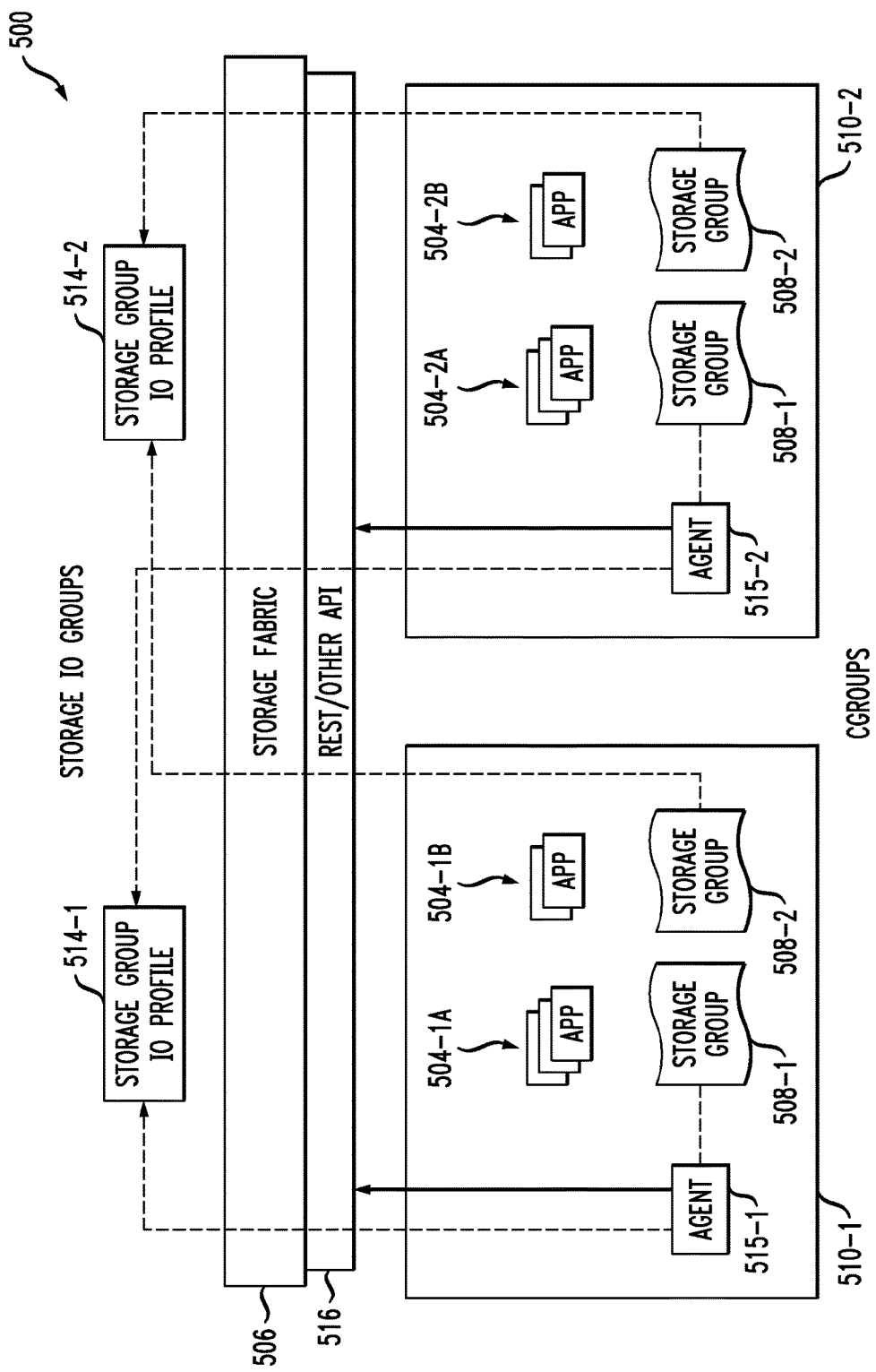
FIG. 5 shows another illustrative embodiment of an information processing system with coordinated resource allocation between container groups and storage groups.

Another illustrative embodiment of an information processing system with coordinated resource allocation between container groups and resource groups is shown in FIG. 5. In this embodiment, an information processing system 500 comprises container groups 504, storage fabric 506, storage groups 508, container-storage groups 510, storage group IO profiles 514 and controller 515.

The container groups 504 more particularly comprise sets of containers 504-1A and 504-1B of container-storage group 510-1 and sets of containers 504-2A and 504-2B of container-storage group 510-2. Each of these containers is assumed to run a corresponding application as illustrated. The container groups 504 are assumed to be supported by container host devices that are not explicitly shown in the figure.

The storage fabric 506 is coupled to the container host devices via at least one API 516, which may comprise a RESTful API possibly in combination with one or more additional APIs of other types.

The storage groups 508 include first and second storage groups denoted 508-1 and 508-2, respectively. The storage groups 508-1 and 508-2 are associated with respective storage group IO profiles 514-1 and 514-2 that indicate allocations of system IO resources of the storage fabric 506 to the respective storage groups. Although the storage groups 508 are illustratively shown as part of the container-storage groups 510 on the container group side of the figure, this is for purposes of illustration only, and it is to be understood that the corresponding storage resources are part of the storage fabric 506.

The storage group 508-1 includes storage resources such as the system IO resources of the storage fabric 506 as allocated in accordance with the storage group IO profile 514-1. These storage resources are utilized by the applications running in containers 504-1A of the container-storage group 510-1 and by the applications running in containers 504-2A of the container-storage group 510-2.

The storage group 508-2 includes storage resources such as the system IO resources of the storage fabric 506 as allocated in accordance with the storage group IO profile 514-2. These storage resources are utilized by the applications running in containers 504-1B of the container-storage group 510-1 and by the applications running in containers 504-2B of the container-storage group 510-2.

The controller 515 comprises separate software agents 515-1 and 515-2 associated with the respective container-storage groups 510-1 and 510-2. These software agents communicate with the storage fabric 506 via the one or more APIs 516. For example, the software agents can access the storage IO profiles 514 via the one or more APIs 516. The storage agents can be configured to run on the same container host devices that host the container groups 504, for example, as respective software daemons implemented on those host devices. Additionally or alternatively, at least portions of the software agents can be implemented as respective components of the storage fabric 506.

The controller 515 in the present embodiment is advantageously configured to coordinate establishment of container host resource allocations for the container groups 504 with the storage group IO profiles 514 established for the respective storage groups 508. In this embodiment, storage resources of each storage group 508-1 and 508-2 are utilized by both of the container groups 504-1 and 504-2, which is distinct from the arrangements in FIGS. 1-3 in which there is a one-to-one relationship between container groups and storage groups. Nonetheless, the controller 515 via its component software agents 515-1 and 515-2 controls the scaling of at least the container host resource allocations so as to establish a uniformity between the container host resource and storage resource allocations across the container groups 504 and the storage groups 508 of the container-storage groups 510.

As one example, the controller 515 may be configured to ensure that a system disk IO limit or network bandwidth limit of one or more of the container groups 504 is consistent with the corresponding resource limits of storage group IO profiles 514.

As another example, the controller 515 may be configured to establish end-to-end QoS guarantees for one or more of the applications running in containers of the container groups 504 based at least in part on the coordination of the container host resource allocations with the storage group IO profiles 514.

The controller 515 can also generate information indicative of relative levels of utilization of at least a subset of the allocated container host and storage resources across the container-storage groups 510 or selected portions of the container-storage groups. Such information may be in the form of a heat map comparing resource utilization of different ones of the container-storage groups, or of selected portions of different ones of the container-storage groups, similar to the arrangements described in conjunction with FIGS. 2 and 3.

The controller 515 can additionally or alternatively be configured to implement one or more API-driven control planes for the applications running in the containers of the container groups 504. For example, such a control plane can be used to provide continuity between the storage group IO profiles 514 and the container host resource allocations of the container groups 504. In an arrangement of this type, applications can utilize control planes implemented by the software agents of the controller to request information regarding storage group IO profiles, and that information can be used to facilitate efficient container host resource allocation for one or more container groups.

It should again be noted that the particular arrangement of components in the system 500 of FIG. 5, like those of the systems of FIGS. 1-3, is presented by way of illustrative example only, and should not be construed as limiting in any way.

The illustrative embodiments described above provide significant advantages over conventional arrangements.

For example, in some embodiments overall system resource utilization is significantly improved by eliminating mismatches between container host resource allocations and storage resource allocations.

This illustratively involves providing an advantageous level of additional infrastructure intelligence that allows container groups and storage groups to remain synchronized in terms of their respective container host and storage resource allocations and therefore to operate at increased efficiency for various workloads. Additionally or alternatively, intelligent real-time algorithms and associated analytics can be implemented to facilitate provision of resource allocation continuity and end-to-end QoS guarantees between container host devices and associated backend storage.

As another example, some embodiments are configured to permit resource allocation policies to be applied from an application-centric viewpoint. Such arrangements permit third-party applications to specify policies for different workloads with the policies being propagated in an automated and analytical manner across multi-tenant architectures. A consistent policy can be applied and enforced end-to-end for both container host resources and storage resources associated with a given workload.

Also, the alignment of resource allocation between container host devices and backend storage in some embodiments provides additional metering and monitoring capabilities such as the above-described heat map utilities. Such arrangements facilitate the development of insightful models for predicting resource utilization and availability within the system.

It should be understood that the particular sets of modules and other components implemented in the systems 100, 200, 300 and 500 as described above are presented by way of example only. In other embodiments, only subsets of these components, or additional or alternative sets of components, may be used, and such components may exhibit alternative functionality and configurations. For example, numerous alternative container environments can be provided comprising multiple container groups utilizing underlying storage resources of a storage platform.

Also, the particular processing operations and other system functionality described in conjunction with the diagrams of FIGS. 1 through 5 are presented by way of illustrative example only, and should not be construed as limiting the scope of the invention in any way. Alternative embodiments can use other types of processing operations involving other information processing system components.

It is to be appreciated that functionality such as that described in conjunction with the diagrams of FIGS. 1 through 5 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally comprise other virtualization infrastructure such as virtual machines implemented using a hypervisor. Such cloud infrastructure can therefore be used to provide what is also referred to herein as a container environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100, 200, 300 or 500 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, container groups, storage groups and controllers that can benefit from coordination of container host resource allocation with storage resource allocation. Also, the particular configurations of system and device elements shown in FIGS. 1-3 and 5 and their associated processing operations in FIG. 4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a plurality of container host devices each implementing one or more containers;
at least one storage platform coupled to the plurality of container host devices and implementing storage resources for utilization by processes running in the containers; and
a controller associated with at least a subset of the container host devices and the storage platform;
the containers implemented by the container host devices being arranged in a plurality of container groups;
the storage resources implemented by the storage platform being arranged in a plurality of storage groups;
wherein the controller is configured to coordinate establishment of container host resource allocations for one or more of the container groups with establishment of storage resource allocations for one or more of the storage groups at least in part by controlling scaling of at least one of the container host resource allocations and the storage resource allocations so as to establish a uniformity between said container host resource allocations and said storage resource allocations; and
wherein the controller is further configured to establish an end-to-end quality of service guarantee for one or more of the processes based at least in part on said coordinated establishment of container host resource allocations and storage resource allocations.

2. The apparatus of claim 1 wherein each of the container host devices comprises at least one processor coupled to a memory.

3. The apparatus of claim 1 wherein at least a subset of the processes running in the containers comprise respective applications.

4. The apparatus of claim 1 wherein the storage platform comprises at least one of a storage array and a storage fabric.

5. The apparatus of claim 1 wherein the controller is implemented at least in part as at least one software agent running on at least one of the container host devices.

6. The apparatus of claim 5 wherein the controller comprises a plurality of software agents each associated with a different one of the container groups.

7. The apparatus of claim 5 wherein the software agent is configured to communicate with the storage platform via at least one application programming interface.

8. The apparatus of claim 1 wherein the container host resource allocations comprise one or more of system RAM, system CPU, system disk IO and network bandwidth allocations.

9. The apparatus of claim 1 wherein the storage resource allocations comprise one or more of system IO and system bandwidth allocations.

10. The apparatus of claim 1 wherein portions of the container groups are arranged with corresponding portions of the storage groups into respective ones of a plurality of container-storage groups.

11. The apparatus of claim 10 wherein the controller is further configured to generate information indicative of relative levels of utilization of at least a subset of the container host resource allocations and the storage resource allocations across multiple ones of the container-storage groups.

12. The apparatus of claim 11 wherein the generated information comprises a heat map comparing resource utilization of at least a first one of the container-storage groups with resource utilization for at least a second one of the container-storage groups.

13. An information processing system comprising the apparatus of claim 1.

14. A method comprising:
arranging containers in a plurality of container groups, the containers being implemented by a plurality of container host devices;
arranging storage resources in a plurality of storage groups, the storage resources being implemented by at least one storage platform for utilization by processes running in the containers;
coordinating establishment of container host resource allocations for one or more of the container groups with establishment of storage resource allocations for one or more of the storage groups at least in part by controlling scaling of at least one of the container host resource allocations and the storage resource allocations so as to establish a uniformity between said container host resource allocations and said storage resource allocations; and
establishing an end-to-end quality of service guarantee for one or more of the processes based at least in part on said coordinated establishment of container host resource allocations and storage resource allocations;
wherein each of the container host devices comprises at least one processor coupled to a memory.

15. The method of claim 14 further comprising arranging portions of the container groups with corresponding portions of the storage groups into respective ones of a plurality of container-storage groups.

16. The method of claim 15 further comprising generating information indicative of relative levels of utilization of at least a subset of the container host resource allocations and the storage resource allocations across multiple ones of the container-storage groups.

17. The method of claim 16 wherein the generated information comprises a heat map comparing resource utilization of at least a first one of the container-storage groups with resource utilization for at least a second one of the container-storage groups.

18. A non-transitory processor-readable storage medium having stored therein program code of one or more software programs, wherein the program code when executed by at least one processing device causes the processing device:
- to arrange containers in a plurality of container groups, the containers being implemented by a plurality of container host devices;
- to arrange storage resources in a plurality of storage groups, the storage resources being implemented by at least one storage platform for utilization by processes running in the containers; and
- to coordinate establishment of container host resource allocations for one or more of the container groups with establishment of storage resource allocations for one or more of the storage groups at least in part by controlling scaling of at least one of the container host resource allocations and the storage resource allocations so as to establish a uniformity between said container host resource allocations and said storage resource allocations; and
- to establish an end-to-end quality of service guarantee for one or more of the processes based at least in part on said coordinated establishment of container host resource allocations and storage resource allocations.

19. The processor-readable storage medium of claim 18 wherein the storage medium comprises at least one of an electronic memory and a storage disk.

20. The processor-readable storage medium of claim 18 wherein the program code when executed by said at least one processing device further causes the processing device:
- to arrange portions of the container groups with corresponding portions of the storage groups into respective ones of a plurality of container-storage groups; and
- to generate information indicative of relative levels of utilization of at least a subset of the container host resource allocations and the storage resource allocations across multiple ones of the container-storage groups.

* * * * *